G. A. BADER.

EYEGLASS MOUNTING.

APPLICATION FILED AUG. 12, 1910.

Reissued Sept. 20, 1910.

13,151.

Witnesses:

L. Thow.

C. W. Carroll

Inventor:

Gustav A. Bader by Olson & Davis & Dorr, his attorneys

THE NORRIS PETERS CO., WASHINGTON, D. C.

UNITED STATES PATENT OFFICE.

GUSTAV A. BADER, OF ROCHESTER, NEW YORK.

EYEGLASS-MOUNTING.

13,151. Specification of Reissued Letters Patent. Reissued Sept. 20, 1910.

Original No. 957,925, dated May 17, 1910, Serial No. 504,931. Application for reissue filed August 12, 1910. Serial No. 576,932.

*To all whom it may concern:*

Be it known that I, GUSTAV A. BADER, a citizen of the United States, and resident of Rochester, in the county of Monroe and State of New York, have invented certain new and useful Improvements in Eyeglass-Mountings, of which the following is a specification.

This invention relates to improvements in eye-glass mountings, and has for its object one that is strong, simple and adjustable.

Figure 1:
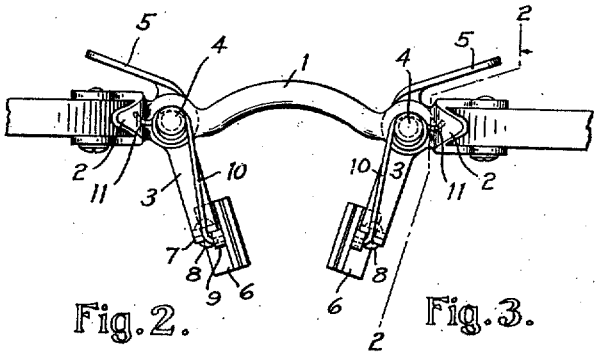
Figure 5:
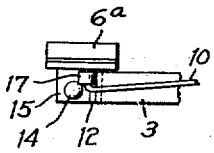
Figure 2:
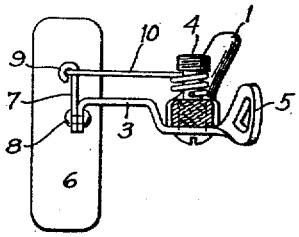
Figure 3:
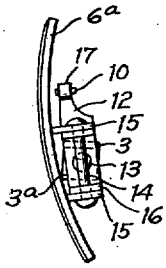
Figure 4:
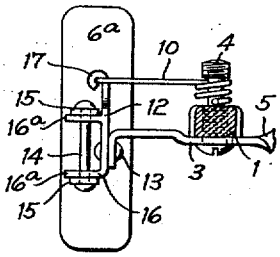
Figure 6:
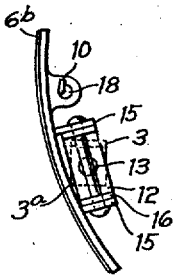
Figure 7:
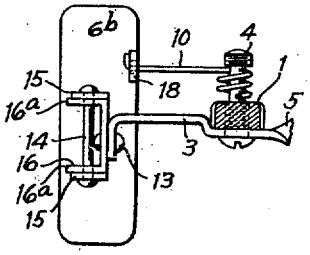
Figure 8:
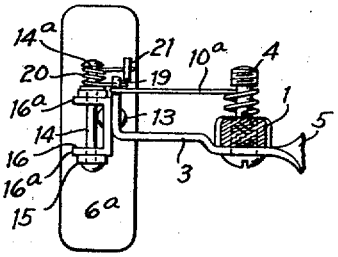
Figure 9:
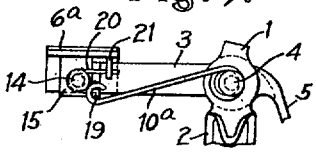

In the drawings:—Figure 1 is a top view of a pair of eye-glasses equipped with the improvements; Fig. 2 is a section on the line 2—2 of Fig. 1; Figs. 3 and 4 show a modification, Fig. 3 being a side view of Fig. 4, looking to the right, and the latter being a section on a line corresponding with 2—2 of Fig. 1; Fig. 5 is a partial top view of either Fig. 2 or Fig. 4; Figs. 6 and 7 show another modification, Fig. 7 being a section on a line corresponding with 2—2 of Fig. 1, and Fig. 6 being a side view of Fig. 7, looking to the right, and Figs. 8 and 9 show still another modification, Fig. 8 being a section on a line corresponding with 2—2 of Fig. 1, and Fig. 9 being a top view.

The invention relates specifically to the nose-guards or nose-clamps, and while a rigid bow 1, and lens-clips 2, 2, are shown, they merely serve to explain the position and operation of the novel features. Furthermore, the nose-guards are represented as pivotally supported, adjacent to the clips, by bolts 4, 4 that are threaded into the continuation of the bow at each end, and levers 5, 5 are shown for operating the nose-guards, but that particular construction is not essential. The novel features are those which particularly relate to the connections of the nose-guards 6, 6, with their brackets, 3, 3, which will now be described.

Referring first to the construction shown in Figs. 1 and 2, it will be observed that the nose-guards are pivoted, respectively, to their brackets at 8, 8, and that for this purpose lugs 7, 7 are secured to the backs of the nose-guards; also that the upper ends 9, 9 of these lugs are each adapted to engage one end of a spring 10 that is put under tension and tends both to hold yieldingly toward each other the brackets that carry the nose-guards, and to rock the nose-guards themselves toward each other at their upper ends. The springs 10, 10 shown for this purpose are coiled upon the bolts 4, 4, and have each an end extended to engage one of the nose-guards in the manner and for the purpose explained, and another end extended to engage the frame at 11, whereby it is held under tension. The ends of the brackets 3, 3 act as stops to limit the inclination of the nose-guards under the action of the springs, these ends having shoulders engaging the nose-guards as in the case of the shoulders $3^a$ in Figs. 3 and 6. The levers 5, 5 are used to spread the brackets apart.

The construction of Figs. 3 and 4 differs from that just described in that the nose-guards $6^a$, $6^a$, are so connected with the brackets 3, 3, that they are adapted to rotate thereon in two directions instead of one. Thus, instead of pivoting the nose-guards $6^a$, $6^a$ directly to the brackets 3, 3, as before, other brackets 12, 12 are pivoted to the brackets 3, 3, as at 13, 13, and the nose-guards are pivoted, respectively, to these secondary brackets, as by bolts 14, 14, the latter passing through ears 15, 15 on the nose-guards and ears 16, 16 on the secondary brackets 12, 12. As before, springs under tension hold the brackets 3, 3 yieldingly opposite each other and tilt the upper end of each nose-guard $6^a$ toward the other, doing so in this case by engaging an arm 17 on the secondary bracket 12, and, the ends $3^a$, $3^a$ of the brackets 3, 3 act as stops. In the construction shown in Figs. 3 and 4, the rotation of the nose-guards about the axes of the bolts 14, 14 is free from spring control.

The construction shown in Figs. 6 and 7 differs from that last described only in the fact that the springs 10, 10, which are under tension as before described, engage the nose-guards $6^b$, $6^b$ themselves, at 18, 18, in each case inside the plane of the bolts 14, 14, and above their pivoted connection with the brackets, 3, 3, so that the nose-guards besides tilting at their upper ends as before described, also have their outer edges turned inwardly and are yieldingly held in that position by the springs. Suitable stops, as for example, $16^a$, $16^a$ on the secondary brackets 12, 12 limit the movement of the nose-guards around the axes represented by the bolts 14, 14.

In Figs. 8 and 9, the construction is practically the same as that shown in Figs. 3 and 4, except that in addition to the springs 10, 10, which in the construction shown in Figs. 3 and 4 engage under tension arms 17, 17 on the secondary brackets 12, 12, that carry the nose-guards, the springs $10^a$, $10^a$ here shown (in Figs. 8 and 9) engage under tension the ends of the brackets 3, 3, at 19, 19, while a second pair of springs 20, 20 are coiled upon extensions $14^a$, $14^a$ of the bolts 14, 14, engaging at one end, under tension, the nose-guards at points 21, 21 (that are inside the axis of said bolts and above their pivotal connections 13, 13 with the brackets 3, 3), and at their other end engaging the brackets 3, 3. Accordingly, in this construction (that shown in Figs. 8 and 9), the upper ends of the nose-guards are yieldingly tilted forward toward each other till they engage as before the ends $3^a$, $3^a$ of the nose-guards 3, 3, and at the same time their forward edges are turned inwardly till they engage stops $16^a$, $16^a$ on the secondary brackets 12, 12, being held in that position yieldingly by the said second set of springs.

What I claim is:

1. In eye-glass mountings, the combination with a frame comprising a bow, lens-clips and nose-guard brackets, of nose-guards pivoted to their brackets; means for yieldingly tilting the upper ends of said noseguards toward each other; and stops for limiting the movement of said nose-guards; substantially as shown and described.

2. In eye-glass mountings, the combination with a frame comprising a bow, lens-clips and nose-guard brackets, of nose-guards pivoted to their brackets; springs carried by the frame and adapted, respectively, to engage said nose-guards to tilt them toward each other; and stops for limiting the movement of said nose-guards under the action of said springs; substantially as shown and described.

3. In eye-glass mountings, the combination with a frame comprising a bow, lens-clips and nose-guard brackets, of nose-guards pivoted to their brackets; springs each attached under tension at one end to the frame and at its other end to one of the nose-guards above its pivotal connection with its bracket; and stops for limiting the movement of said nose-guards under the action of said springs; substantially as shown and described.

4. In eye-glass mountings, the combination with a frame comprising a bow, lens-clips and nose-guard brackets, of nose-guards, having pivotal connections with their brackets; and means whereby said nose-guards also rotate at right angles to such connections; substantially as shown and described.

5. In eye-glass mountings, the combination with a frame comprising a bow, lens-clips and nose-guard brackets, of nose-guards, having pivotal connections with their brackets; means whereby said nose-guards also rotate at right angles to such connections; means for yieldingly rocking said nose-guards upon one pair of axes; and stops adapted to limit such movement; substantially as shown and described.

6. In eye-glass mountings, the combination with a frame comprising a bow, lens-clips and nose-guard brackets, of nose-guards, having pivotal connections with their brackets; means whereby said nose-guards also rotate at right angles to such connections; springs for yieldingly rocking said nose-guards upon one pair of axes; and stops adapted to limit such movement; substantially as shown and described.

7. In eye-glass mountings, the combination with a frame comprising a bow, lens-clips and nose-guard brackets, of nose-guards, having pivotal connections with the brackets; means whereby said nose-guards also rotate on axes at right angles to such connections; springs adapted to yieldingly rock said nose-guards upon both of their axes; and stops adapted, respectively, to limit such movement; substantially as shown and described.

8. In eye-glass mountings, the combination with a frame comprising a bow, lens-clips and nose-guard brackets, of secondary brackets pivoted to the ends of the brackets first mentioned, respectively, and nose-guards pivotally supported by said secondary brackets, on axes parallel with the plane of their rotation around said first-mentioned brackets; substantially as shown and described.

9. In eye-glass mountings, the combination with a frame comprising a bow, lens-clips and nose-guard brackets, of secondary brackets pivoted to the ends of the brackets first mentioned, respectively, and nose-guards pivotally supported by said secondary brackets, on axes parallel with the plane of their rotation around said first mentioned brackets; springs adapted to yieldingly rock said nose-guards upon one pair of axes; and stops adapted, respectively, to limit such movement; substantially as shown and described.

10. In eye-glass mountings, the combination with a frame comprising a bow, lens-clips and nose-guard brackets, of secondary brackets pivoted to the ends of the brackets first mentioned, respectively, and nose-guards pivotally supported by said secondary brackets, on axes parallel with the plane of their rotation around said first mentioned brackets; springs adapted to rock said nose-guards upon both of their axes; and stops adapted, respectively, to limit such movement; substantially as shown and described.

11. In eye-glass mountings, the combination with a frame, of nose-guard brackets pivotally supported opposite each other, each pivotally supporting in turn a nose-guard at its outer end; and a pair of springs supported by the frame, adapted respectively, to engage one of said parts under tension; substantially as shown and described.

12. In eye-glass mountings, the combination with a frame, of nose-guard brackets pivotally supported opposite each other, each pivotally supporting in turn a nose-guard at its outer end; and a pair of springs supported by the frame adapted, respectively, to engage said nose-guards under tension, and thereby tilt them against suitable stops; substantially as shown and described.

13. In eye-glass mountings, the combination with a frame comprising a bow, lens-clips and nose-guard brackets, of secondary brackets pivoted to the ends of said first mentioned brackets, respectively, and nose-guards pivotally supported by said secondary brackets, on axes parallel with the plane of their rotation around said first mentioned nose-guards; and a pair of springs supported by the frame adapted, respectively, to engage the nose guards under tension to rotate them against suitable stops; substantially as shown and described.

14. In eye-glass mountings, the combination with a frame comprising a bow, lens-clips and nose-guard brackets, of secondary brackets pivoted to the ends of said first mentioned brackets, respectively, and nose-guards pivotally supported by said secondary brackets, on axes parallel with the plane of their rotation around said first mentioned brackets; and pairs of springs adapted, respectively, to turn the outer edges of said nose-guards yieldingly inwardly against suitable stops; substantially as shown and described.

GUSTAV A. BADER.

Witnesses:
L. THON,
C. W. CARROLL.